US008594389B2

(12) United States Patent
Cohen et al.

(10) Patent No.: US 8,594,389 B2
(45) **Date of Patent: *Nov. 26, 2013**

(54) SECURITY SYSTEM AND METHOD

(76) Inventors: Yossef Gerard Cohen, Rosh Ra'ayin (IL); Eliahu Elson, Ramat Gan (IL)

( * ) Notice: Subject to any disclaimer, the term of this patent is extended or adjusted under 35 U.S.C. 154(b) by 488 days.

This patent is subject to a terminal disclaimer.

(21) Appl. No.: 12/625,190

(22) Filed: Nov. 24, 2009

(65) Prior Publication Data

US 2010/0077421 A1 Mar. 25, 2010

Related U.S. Application Data

(63) Continuation-in-part of application No. PCT/IL2008/000702, filed on May 25, 2008.

(30) Foreign Application Priority Data

May 24, 2007 (IL) ........................................ 183385

(51) Int. Cl.
*G06K 9/00* (2006.01)

(52) U.S. Cl.
USPC ............................ 382/117; 382/115; 382/118

(58) Field of Classification Search
USPC .......... 382/117, 115, 118; 349/380, E05.091; 725/10
See application file for complete search history.

(56) References Cited

U.S. PATENT DOCUMENTS 4,931,865 A * 6/1990 Scarampi ........................ 725/12
5,686,992 A * 11/1997 Kawamoto .................... 356/601
5,990,973 A 11/1999 Sakamoto
6,539,100 B1 * 3/2003 Amir et al. .................... 382/117
2006/0011716 A1 1/2006 Perkowski
2006/0072792 A1 * 4/2006 Toda et al. .................... 382/115
2007/0013652 A1 1/2007 Kim et al.
2009/0132352 A1 * 5/2009 Kerven et al. .................. 705/14

FOREIGN PATENT DOCUMENTS

EP 1333410 A 8/2003
EP 1336372 A 8/2003
EP 1583035 A 10/2005
JP 06150087 A 5/1994
JP 2005196385 A 7/2005
JP 2005-318554 * 11/2005
JP 2006163900 A 6/2006
WO 01/10338 2/2001
WO 2007/101690 A 9/2007

OTHER PUBLICATIONS

Kawagichi, the English version of Abstract of JP2005-318554, Nov. 10, 2005.*

* cited by examiner

*Primary Examiner* — Ruiping Li
(74) *Attorney, Agent, or Firm* — Leber Patent Law P.C.

(57) ABSTRACT

A security system and method for detecting the presence of one or more persons in a location, by: directing a light source in the direction of the location; detecting reflections of the light source from the location by a light detector in order to form an image representing the one or more persons' eyes; and analyzing the image received on the light detector to identify and count the number of eyes on the image. Preferably, the analyzed information is then communicated to a remote facility for further processing. Appropriate action to take based on the analyzed information includes issuing an alert, turning on an alarm system, sending a message to one or more predetermined persons and/or machines.

20 Claims, 12 Drawing Sheets

| Excitation (nm) | Width (nm) | Emission (nm) | Width (nm) | Intensity |
|---|---|---|---|---|
| 292 | 3 | 366 | 14 | 82 |
| 335 | 4 | 385 | 8 | 82 |
| 335 | 4 | 442 | 8 | 81 |
| 357 | 10 | 455 | 10 | 89 |
| 468 | 2 | 505 | 6 | 46 |
| 560 | 6 | 599 | 2 | 14 |
| 600 | 4 | 633 | 4 | 3 |

Rear View

Indoors Alert System

SECURITY SYSTEM AND METHOD

CROSS-REFERENCE TO RELATED APPLICATIONS

This application is a continuation-in-part of International Patent Application PCT/IL2008/000702 filed on May 25, 2008, which, in turn, claimed the benefit of Israeli Patent Application No. 183385, filed May 24, 2007. The subject matter contained in the related application and patents is specifically incorporated herein by reference.

FIELD OF THE INVENTION

The present invention relates to a security system and method for detecting people, and in particular for detecting people via reflections from the eyes.

BACKGROUND OF THE INVENTION

A variety of security systems are available today to protect homes, businesses and other locations. The technologies used by these systems include infrared and ultrasonic motion detectors, video surveillance systems, or thermal systems. Some systems are wired to monitoring services or patrolled by guards for around-the-clock protection. These systems typically cost thousands of dollars to install and can be much more expensive. Some systems use sophisticated image processing algorithms to identify human shapes or faces in an image taken from a protected scene.

General methods for identifying people are known in the art, for example, methods based on image processing algorithms. US Patent Application 2006/0062429 suggests a method for detecting motion in the image and comparing two images take at different subsequent times. Applying an image processing algorithm determines if at least one shape represents a person. US Patent Application 2006/0200841 suggests a method of identifying people in an image by identifying human-like shapes in a captured image. These types of methods image processing are expensive to implement and require substantial processing power.

Eye tracking applications are also known, in particular for use with handicapped people. These applications, which also use expensive signal processing hardware and software, typically require the person to sit in a distance of up to 60 centimeters of the screen, and are only suited for tracking the eyes of a single person.

Photographs of people taken with a camera using flash often exhibit a phenomenon called red-eye. The effect is caused by reflection of the camera flash from the back of the eye. Typically the pupil of the eye develops a greater or lesser degree of red color. However, other colors can occur (such as gold-eye) and the effect may be sufficiently intense to eliminate all detail in the eye so that the pupil and iris cannot be distinguished, forming a single red blob. The likelihood of red-eye is increased when the eye is dark-adapted and the pupil is wide open, which represents precisely the low light situation that requires flash illumination. In such a case, the pupil does not have time to close before a reflection occurs from the back of the eye. The effect is further increased for inexpensive or compact cameras having a flash mounted close to the axis of the lens, which increases the likelihood that reflected light will enter the lens. This has the unfortunate effect that the most pronounced red-eye can occur when the eye is small compared to the size of the image, and so is hardest to correct. Further impediments to correction result, for instance, from reflections caused by contact lenses.

SUMMARY OF THE INVENTION

The present invention relates to a security system and method for detecting the presence of people (or animals) in a given location to be watched.

The invention thus relates to a security system for detecting the presence of one or more persons in a location to be monitored, the system comprising:

(i) one or more light sources directed in the direction of said location;

(ii) one or more light detectors for detecting reflections of said one or more light sources from said one or more persons to form an image representing eyes of said one or more persons;

(iii) a scanning module to direct said one or more light sources and said one or more light detectors at narrow portions of said location at a time;

(iv) a scanning controller for driving said scanning module; and (iii) a processing unit for analyzing the images received on the one or more light detectors to form an image representing eyes in said location and to identify and count the number of eyes on the image.

In one embodiment of the present invention, the system further contains communications lines for communicating the analyzed information to a remote facility. A communication line can be a wired and/or wireless line.

The definition of "image" as referred to herein should be interpreted in a large sense and also to include a signal received from a single light detector or from an array of light detectors.

The term "audience" or "person" as defined herein should be interpreted to include both human beings and animals.

The first component of the system is a light source directed in the direction of the persons to be detected. The light source can be in the visible spectrum, infrared (IR) spectrum or even ultraviolet (UV) spectrum. The light source sends out a light beam that is reflected by each open eye of a person in the location.

The reflected light from the retina or cornea is captured by a light detector. The light detector can be a matrix of sensors such as a Charge Coupled Device (CCD) or Complementary Metal Oxide Semiconductor (CMOS). The light detection technology can include silicon, Gallium Arsenide or any other known technology. Alternatively, the light detector can be a line sensor or a single pixel sensor of any type known in the art, for example, a photodiode or similar sensor. The light detector is sensitive to the wavelength of the light source. An optional spectral filter may be installed in front of the light detector in order to enhance the captured signal quality and filter unnecessary background light not related to measuring the number of eyes.

The light detector can use any optical lens (single or compound) known in the art in order to optimize the light detection process.

The invention exploits a phenomenon known as "redeye", which often occurs when taking pictures of people in dark environments using a compact camera with a flash. For small camera frames the flash is located too close to the camera's optical axis, causing flash light to reflect from a subject's retina back onto the image sensor. This frequently results in pictures of people with red eyes. While current applications concerning the redeye effect concentrate their efforts in disabling this effect, the present invention focuses its efforts to enhance and emphasize the redeye effect, for example by choosing the optimal wavelength according to the transmission of the optical components of the eye and the reflection of the retina, by optimizing with the spectral sensitivity of the device detector. The invention thus identifies and counts the number of eyes in the captured image. Analyzed information can then be sent to a remote facility via any available communication mean such as the Internet, the telephone line (both wired and wireless) or any private or public network.

The term “redeye” as referred herein should be interpreted as the phenomenon of a reflection from the retina/cornea. The phenomenon does not mean that the eyes return a red color or any other color, but merely that it returns a reflection that can be identified. For example, when working with infrared illumination, the reflection from the retina/cornea is captured as a bright spot, without any particular color.

In addition, the invention can use the reflected light from the cornea which appears as bright spots on the iris. The invention can also identify eyes by detecting reflected light from the cornea. Alternatively, reflections from both the retina and the cornea can be used to detect eyes.

The system then analyzes each image to match pairs of eyes, so that each pair is counted like a single person. According to predefined system parameters, depending upon the commercial and technical implementation of the invention, the system communicates the analyzed data to a remote facility for further processing.

The system of the invention does not track the position of each eye, but rather detects and counts open eyes in each captured image. The system can detect and count eyes from a distance of about 40 cm up to tens of meters.

In one embodiment of the present invention, the security system is installed in a vehicle (car, truck, train etc.) in order to track if the driver is awake, i.e. his eyes are open. If the system determines that the driver’s eyes have been closed for a predefined period of time, for example one second, then the system can activate an alert such as a audio signal, a light, vibration effect or any combination thereof.

In another embodiment of the present invention, the security system relates identifying and counting the number of animals in a given location, for example the number of fish in a given water body. Estimating the number of living fish can give a good indication as to the sanitary conditions of the water body, and in particular if a current measure is significantly different from past measures.

In another aspect, the present invention relates to a security method for detecting the presence of one or more persons in a location to be monitored, said method comprising the steps of:

(i) directing one or more light sources in the direction of said location;

(ii) detecting reflections of said one or more light sources by one or more light detectors in order to form an image representing eyes of said one or more persons; and (iii) scanning the location by directing said one or more light sources and said one or more light detectors at narrow portions of said location at a time; and (iv) analyzing images received on said one or more light detectors to form an image representing eyes of persons in said location and to identify and count the number of eyes on said image.

In another aspect, the present invention relates to a secured mobile phone, for alerting the user of said mobile phone if said user falls asleep, said mobile phone comprising:

(i) a light sources directed in the direction of said user;

(ii) a light detectors for detecting reflections of said light source from said user to form images representing the eyes of said user; and (iii) a processing unit for analyzing the image received on said light detector to identify if said eyes are open, and issue an alert if the eyes are determined to be closed for more than a predetermined amount of time.

The secured mobile phone, takes pictures of the user with very short intervals to verify that the user’s eyes are open, for example, that the user has not fallen asleep while driving. If the eyes are determined to be closed for more than a predetermined amount of time, then an alert is issued, for example, issuing a loud sound to wake up the user.

In yet another aspect, the present invention relates to an advertising method for sending commercial advertisements to a viewer in front of a display, and rewarding the viewer after verification that they have actually watched the advertisement(s). The method comprises the steps of: (i) directing a light source in the direction of said viewer; (ii) detecting reflections of said light source by a light detector in order to form an image representing said viewer; (iii) analyzing the image received on said light detector to identify and count the number of eyes on said image; (iv) sending one or more advertisement messages to be viewed on said display; (v) detecting the presence of at least one viewer in front of said display; and (vi) rewarding said at least one viewer after detecting that said at least one viewer has watched said one or more advertisement messages.

The display can be a television set, a computer monitor, a projector or any device capable of showing audio-visual messages.

The rewards can be monetary, a promotional product or sample, subscription to a promotional service, subscription to a television channel, a coupon to be redeemed for a discount for a product or service etc.

In yet another aspect, the present invention relates to a method for measuring from a distance the size of the eye’s pupils of a person, the method comprising the steps of: (i) directing a light source in the direction of said person; (ii) detecting reflections of said light source by a light detector in order to form an image representing the eyes of said person; and (iii) analyzing the image received on said light detector to identify and measure the size of the pupils on said image.

Measuring from a distance (say over 40-60 centimeters) the size of the eyes pupils can be beneficial for diagnosing certain medical conditions (i.e. cataract), drugs or substance abuse, alcohol consumption, propensity to take risks (it is said that people with smaller pupils are profiled to be higher risk taking) etc.

BRIEF DESCRIPTION OF THE DRAWINGS

FIG. 13A is a rear view and FIG. 13B is a top view of an in-vehicle setting.

FIG. 14 shows a rear view of the car with a phone that includes the electro-optic detection module and system.

DETAILED DESCRIPTION OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The present invention relates to a security method for detecting the presence of one or more persons in a location, and a system and device for implementing the method. The invention thus provides security method for detecting the presence of one or more persons in a location, the method comprising the steps of:

(i) directing one or more light sources in the direction of said location;

(ii) detecting reflections of said one or more light sources by one or more light detectors in order to form an image representing eyes of said one or more persons; and (iii) scanning the location by directing said one or more light sources and said one or more light detectors at narrow portions of said location at a time; and (iv) analyzing images received on said one or more light detectors to form an image representing eyes of persons in said location and to identify and count the number of eyes on said image.

Optionally, the method can comprise a further step of communicating the analyzed information of (iv) to a remote facility. The remote facility can further process the received data, and can also decide on the appropriate action to take based on the information received, for example, issuing an alert, turning on an alarm system, sending a message to one or more predetermined persons and/or machines etc.

Figure 1:
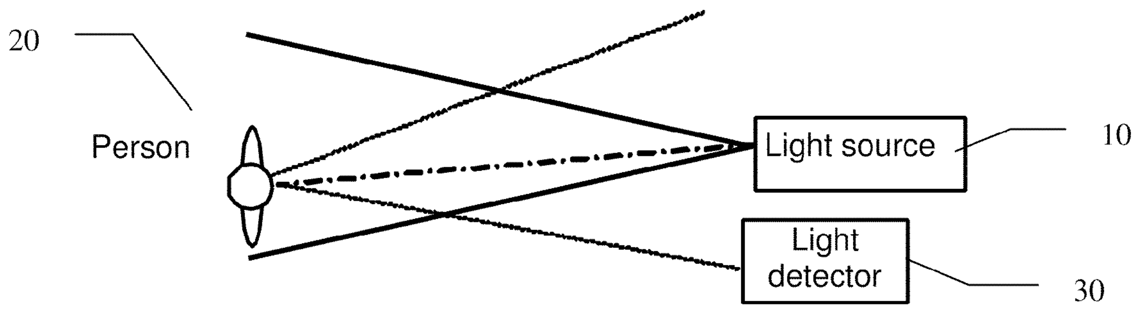
FIG. 1 illustrates a basic setup of a security device of the invention including a light source directed at the direction of a location to be monitored, and an electrooptic sensor receiving the reflected light from the open eyes of a person.

FIG. 1 illustrates the basic elements of the system of the invention: a light source 10 directed in the direction of the location to be monitored and reflecting from a person 20, and a light detector 30 detecting the reflections coming back from the open eyes of the person 20.

The first component is a light source 10 directed in the direction of the person 20 to be detected. The light source 10 can be in ultraviolet spectrum (200-400 nm), in the visible spectrum (400-700 nm (nanometers)) or in the near infrared (NIR) spectrum (respectively 700-3000 nm). This spectrum range, or part of it, is sometimes also referred to as SWIR (Short Wave Infrared).

A light detector 30 is used to capture the reflected light from the persons 20 at the location to be monitored. The light detector 30 can be a Charge Coupled Device (CCD) camera that is a device with light-sensitive photo cells which is used to create bitmap images. Alternatively other types of camera can also be used such as a Complementary Metal Oxide Semiconductor (CMOS) camera, any other digital camera, an analog camera, a camera including an image intensifier coupled to the camera's matrix (intensified camera). The light detector 30 can also be a single sensor or a line camera, or a single detector or a matrix of several detectors (2×2, 4×4, 10×10, 1000×1000 for example, or with different aspect ratio) or four quarter detectors or position sensitive detector. Naturally, the camera includes adequate optical components, familiar to any person skilled in the art, in order to focus the light beams into the electrooptic sensor.

A distinct advantage of a camera compared to a single sensor is that a camera allows distinguishing between different objects in the field of view (FOV) while with a single dimensional sensor each object in the field of view along the line of sight can contribute to the signal, but may not be distinguishable on its own.

Another example of a light detector is a photodiode or an avalanche photodiode.

Alternatively, it is also possible for the invention to use any available natural or artificial light such as the sun light or any indoor artificial lighting.

The invention exploits the "redeye" effect in photography. Redeye (picture of people with red eyes) happens when the light of the flash occurs too fast for the iris of the eye to close the pupil. The flash light is focused by the lens of the eye onto the blood-vessels-rich retina at the back of the eye and the reflection of the illuminated retina is again collected by the camera resulting in a red appearance of the eye on the photo. The "redeye" phenomenon can also occur with animals although the color of the eyes may be different than red. Therefore, it is better to use the near IR wavelength since it does not disturb people 20 and the reflections from the retina are better.

The measured spectral reflection from the retina of the human eye for the spectral range between 400 nm and 1500 nm is known in the art. As known in the art, the reflection local maxima are received at wavelength of 920 nm, 1100 nm and 1300 nm.

Figure 2:
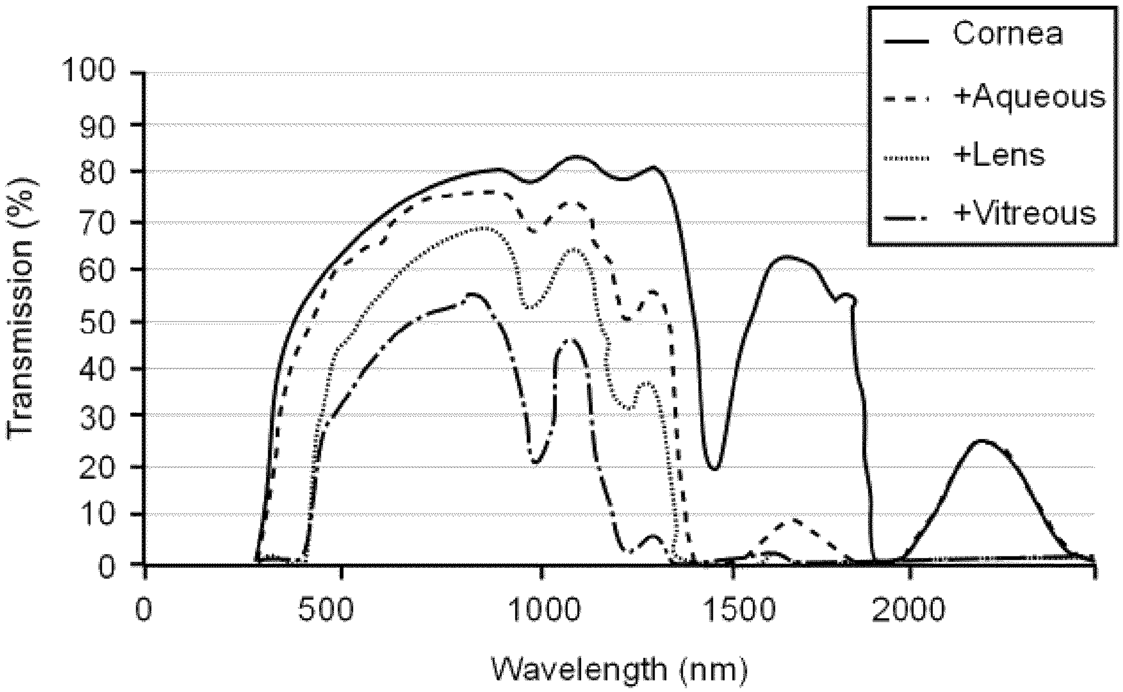
FIG. 2 illustrates the spectral transmission of the different components of the human eye.

FIG. 2 shows spectral contribution of each optical component of the eye. As can be easily seen there are wavelength with better transmission than others. For example, the upper graph shows the transmission through the cornea. In order to know the total reflection back from the eye, it is necessary to calculate both the transmission of the different components of the eye in combination with the reflection from the retina (not shown) as can be found in the literature.

Typical background light that is present in the field of view of the sensor comes from the sun in exterior ambient and from fluorescent or incandescent lamps in interior ambient. This ambient light background is a drawback when trying to discriminate the red eye reflection from the background in an image, because the light levels of the background are high compared to the level reflected from the eye and simple algorithms like histogram threshold or high percentage threshold are not able to distinguish between these two factors. Using short pulses of the light source 10 together with synchronized time gate of the detector can improve the signal to background ratio. For example, the light source 10 can operate in a short pulse and the light detector 30 is then only exposed at exactly the same time and interval as the light pulse so only that integration time of the background is collected. On the other hand, the reflected signal is fully exploited.

The method of the invention analyzes the resulting captured image or images and counts the number of eyes. A pair of adjacent eyes can be associated and counted as a single person. The number of people identified in an image is sent to a processing location every predetermined period of time using available communication lines such as the Internet, telephone networks (wired or wireless), data networks, cable network or any other available communication mean.

It is important for the light source 10 to be located as close as possible to the light detector 30 so that the reflected light going back from the eye to the light source 10 can be captured by the light detector 30.

Upon reading this application, a person skilled in the art will immediately recognize alternative methods for recognizing and counting eyes, and all these alternatives and variations are deemed to be within the scope of the present invention. For example, one can use a second light source 10 that is purposely far from the light detector 30, such that the picture taken when using the second light source 10 will not have the "redeye" effect. By subtracting the two images, an important portion of the background can be eliminated.

Similarly to the "redeye" principle, the invention produces much better results using a light source 10 with a near IR wavelength, as explained before. The resulting eyes in the picture will not be colored in red, but will be nevertheless identifiable by the light detector 30 in a similar manner. Thus the term "light" as used herein refers not only to electromagnetic waves in the visible range of the spectrum but rather to any wave, beam, radiation, electromagnetic wave, light beam, light wave and any other similar term.

The eyes on the captured image can be identified by detecting reflected light from the retina and/or cornea.

Naturally, the spectral range of the light source 10 and the spectral range of the light detector 30 need to match. For example, silicon-based light detectors 30 such as CCD and CMOS cameras are adapted to detect light beams with a wavelength up to 1100 nm. If for example, a light source 10 above 1100 nm is used—a wavelength that is still considered safe for the human eye—then the light detector 30 needs to be based on different technology than silicon, for example, detectors based on the Gallium arsenide (GaAs).

It is important to consider the safety aspects of the light source 10 (such as laser pointers, incandescent bulbs, halogen bulbs, visible or IR lasers, Light Emitting Diode (LED), transistor LED, transistor Laser) and the intensity of the emitted light in order not to cause any potential damage to the eyes. Solid state laser or a laser diode are popular light sources 10 and are implemented today in a variety of devices such as laser pointers. The intensity of the light source 10 such as a solid laser or a laser diode needs to conform to the safety standards such as the American standard ANSI Z136.1 or any similar standard.

The light source 10 can operate in a continuous manner or only emit periodically in pulses. Depending on the light source 10, it can be operated either continuously, in pulses or both. A continuous light source 10 can be made to emit in pulses by using a chopper. A more flexible method is to operate a LED via a wave generator, a signal generator or a specific electronic integrated circuit and thus control the pulses in a flexible and random way. A chopper for example, can be used to create pulses with a constant duty cycle and a constant time cycle. Changing the speed of the wheel can change the time cycle and width of the pulse, but it cannot change each individual pulse. Changing the duty cycle requires changing the wheel to a wheel with different opening spaces.

In a light source 10 such as a LED or lasers, the pulses can be controlled by a signal generator to determine as needed the kind of signal required at each moment. This flexibility can thus be used to influence the momentary intensity of the light source 10 to control the amount of light receive by the light detector 30 in one hand, and meet safety regulations on the other hand.

Using the redeye effect allows to use simple signal-processing algorithms in order to identify eyes in the picture by separating the light returned from the eye from the light returned by the background. For example, when using visible light, the eyes will be colored in red, and thus a primary search for red zones will immediately reduce the number of potential candidates (eyes).

Similarly, using non-visible light the light returned by the eyes will be stronger than the light returned from the background (such as the face), and thus the eyes will be easily detectable. In some instances, the intensity of the light returned from the face might be very similar to that returned from the eyes, especially if the distance from the light source 10 is very short. In these situations, it is necessary to apply additional signal processing algorithms known in the art, and/or combine these algorithms with the use of a second light source 10, not co-lineated with the sensor, as described above. For short ranges the cornea reflection may be useful and thus be exploited for counting eyes.

For more accurate results, further signal-processing refinements are necessary in order to isolate the eyes from the rest of the captured picture, since other spots in the picture may also reflect high intensity light returns. For example, background filtering algorithms known in the art can be used by the invention in order to isolate the eyes from its surroundings. The surroundings may be the light reflection of the background from the light source 10, or it may be an external ambient light illuminating the background.

In one embodiment of the present invention, the light source 10 has a spectrally narrow bandwidth or includes a spectral filter. Examples of spectral filters include but are not limited to: a band pass filter, band stop filter, interference filter, short wave filter, long wave filter, AOTF filter or any mechanical, electrical or electro physical mechanism that can cause a spectral modification of the outgoing light Another example of a preprocessing background filtering method that can be used by the invention is a differential operation of the light source 10. The object is for the light detector 30 to capture an image once with the light source 10 activated and once without the light source 10. By subtracting the two images, an important portion of the background can be eliminated.

The quality of the received signal by the light detector 30 can be increased by increasing the exposure time of the light detector 30. If for example, in a scene where the background is low and the refresh rate for identifying people 20 is set up to be one second, the light detector 30 (camera) can be set up with an exposure time of 500 milliseconds (compared to the 20 milliseconds exposure time of a standard camera), thus increasing the quality of the received signal.

Yet another example of background filtering method is by operating a light source 10 with a narrow spectrum width, that is a light source 10 emitting light within a restricted range of wavelengths, say 30 nm around the 900 nm wavelength. These selected values (chosen here as an example only and can be replaced by other values) offer the advantage that since blood vessels in the retina absorb little light above 600 nm, more of such light is reflected and thus captured by the light detector 30. It is known that the human eye sees light better in the center of the photopic range that is around 550 nm, thus the human eye absorbs more light in the 550 nm range. Above the 600 nm range, the eye is less sensitive and thus absorbs less light. In order to take advantage of the narrow spectrum light source 10, it is essential that the light detector 30 filter will be substantially similar to the light source 10 spectrum.

Another signal-processing technique that can be used by the invention is spectral subtraction. Two images are captured each with a light source 10 in a different wavelength range. For an instance, if two images are captured with light sources 10 of 900 nm and 700 nm respectively. Since the hemoglobin (Hb) in the blood absorbs more light in 900 nm than in 700 nm, and the absorption of melanin pigment of the face is substantially similar at those wavelengths, then again subtracting the two images will help identify the eyes. Since the images are not captured in the dark, it may be needed to filter the background light by a spectral filter such that each time a light source 10 is activated the optical sensor is preceded by an optical filter according to the emitted wavelength of the light source 10.

Different processing methods can be combined to enhance the results of the captured images; these methods may be based on different modes of operation of the light sources 10 and of the light detectors 30. Both spectral subtraction and temporal subtraction for each spectrum can be operated. For example, a first image is captured within spectral bandwidth no. 1 (for example using an Acousto-optic Tunable filter (AOTF)) and a subsequent image is captured at spectral bandwidth no. 2 (by tuning the AOTF to a different bandwidth) simultaneously operating the light source 10 that also match the spectral bandwidth no 2.

A similar but yet different configuration can be performed by using an additional light source 10 that matches also the second bandwidth in the above example, and then taking two additional images with and without each of the light sources 10. Then for each bandwidth, one subtracts the image that was captured without activating the light source 10 from the image captured when the light source 10 was activated. Thus since the response of the eye to each of the spectral bandwidths is different, the difference between these two subtracted images will enhance the reflected light coming from the retina decreasing the light reflected from the surroundings (face and etc.). As a result, a simple threshold or other simple image processing algorithm can be used to finalize the detection of the people 20 presence. The bandwidths example explicitly referenced above are only for the presentation of the concept and other combinations may be used, and also only part of the procedures explained here may be applied. It is also possible to use a plurality of bandwidths (more than two) with similar techniques.

In one embodiment of the present invention, the contrast between the eye and its background is enhanced by using a polarized light source 10 and/or adding a polarizer before the optical sensor in order to improve the signal-to-background ratio (especially where the cornea reflection is used). In yet another embodiment of the present invention, one or more light detectors 30 include a polarizer which is in the same orientation as the polarizer of one or more light sources 10 used.

It is also possible for one or more light detectors 30 to operate in a plurality of exposure times. A light detector 30 with variable exposure time can be helpful in calibrating and adjusting the system in different ambient light environments. It can also be useful to use one or more light sources 10 that operate in pulses of different pulse width in order to calibrate the system for good identification results without causing discomfort to people 20 according to the ambient external light level.

The techniques described above are examples of techniques used in order to get a better image, where the reflection from the eyes is emphasized compared to the background. Many image processing algorithms know in the art may be used in order to detect and count the number of eyes in each image. These algorithms include, but are not limited to threshold discrimination, convolutions, convolutions with different kernel types, blob finding, morphological algorithms, contrast enhancing etc.

Figure 3:
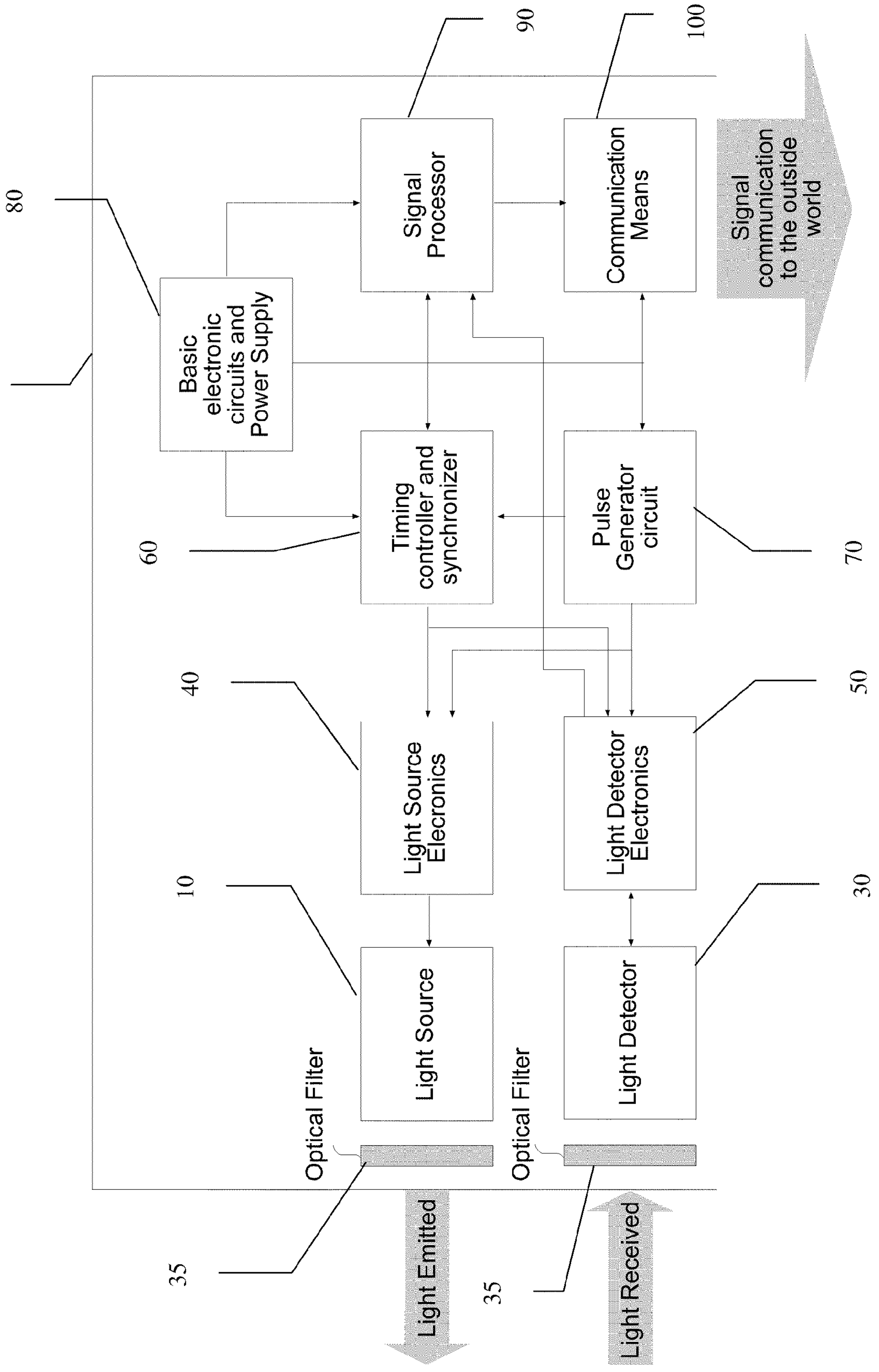
FIG. 3 is a block diagram of an embodiment of a security system of the invention integrated into a single unit.

FIG. 3 is a block diagram of an embodiment of a security system of the invention integrated into a single security device 5. The light source 10, which may optionally include an optical filter 35, is driven by light source electronics 40 providing the necessary current for the corresponding light as a continuous or pulsed light. The light source electronics 40 is operated according to the signals received from the timing and controller synchronizer 60. The main "clock" for the proper operation of the timing controller is provided by the pulse generator circuit 70. Both the timing controller and the pulse generator are initialized from the signal processor 90 that uploads a code and defines the operational parameters of the device such as frame rate, exposure time, gain, filter type etc. The signal processing unit includes non volatile memory for code storing while the device is in an "off" state. The light reflected from the people 20 is received by the light detector or detectors 30, optionally comprising an optical filter 35, that are controlled by the light detector electronics 50. The light detector electronics 50 also receive the current signal from the light detector 30 and amplify the signal before transmission to the signal processor 90. The signal is also digitized by the light detector electronics 50 when the light detector 30 provides an analog signal.

The signal processor 90 analyzes the received signal in order to detect the eye reflections from the scene background and count the number of eye pairs in the scene. In one embodiment, the number of persons 20 detected is transmitted through communications lines 100 to a remote location or facility. The basic electronic circuits and power supply 80 provide all the voltages needed for the operation of the security device 5. The power supply 80 can use electricity from either an external source or from internal batteries.

Figure 4:
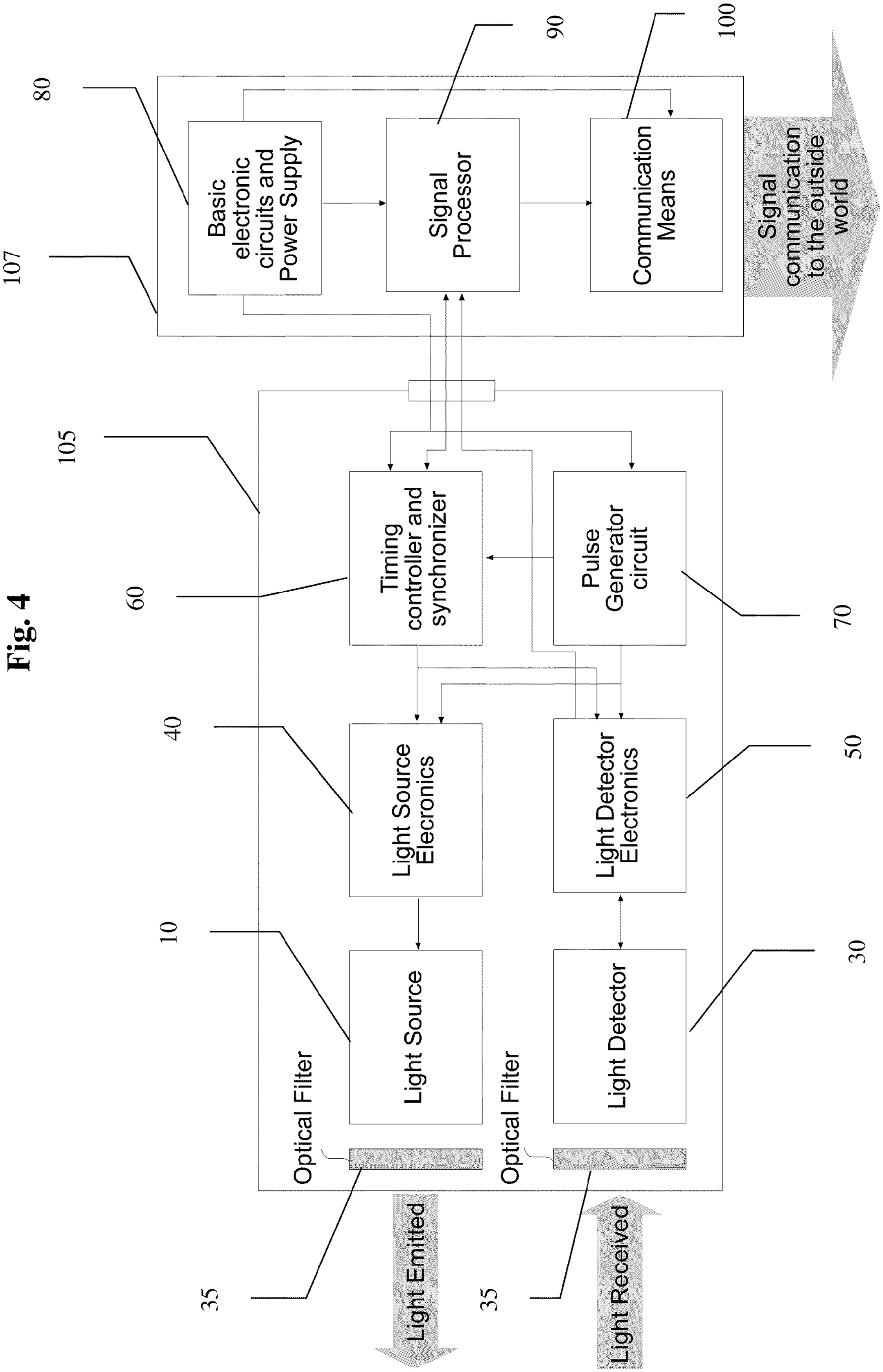
FIG. 4 is block diagram of an embodiment of a security system of the invention wherein the sensing unit is separated from the processing and communication unit.
Figure 5:
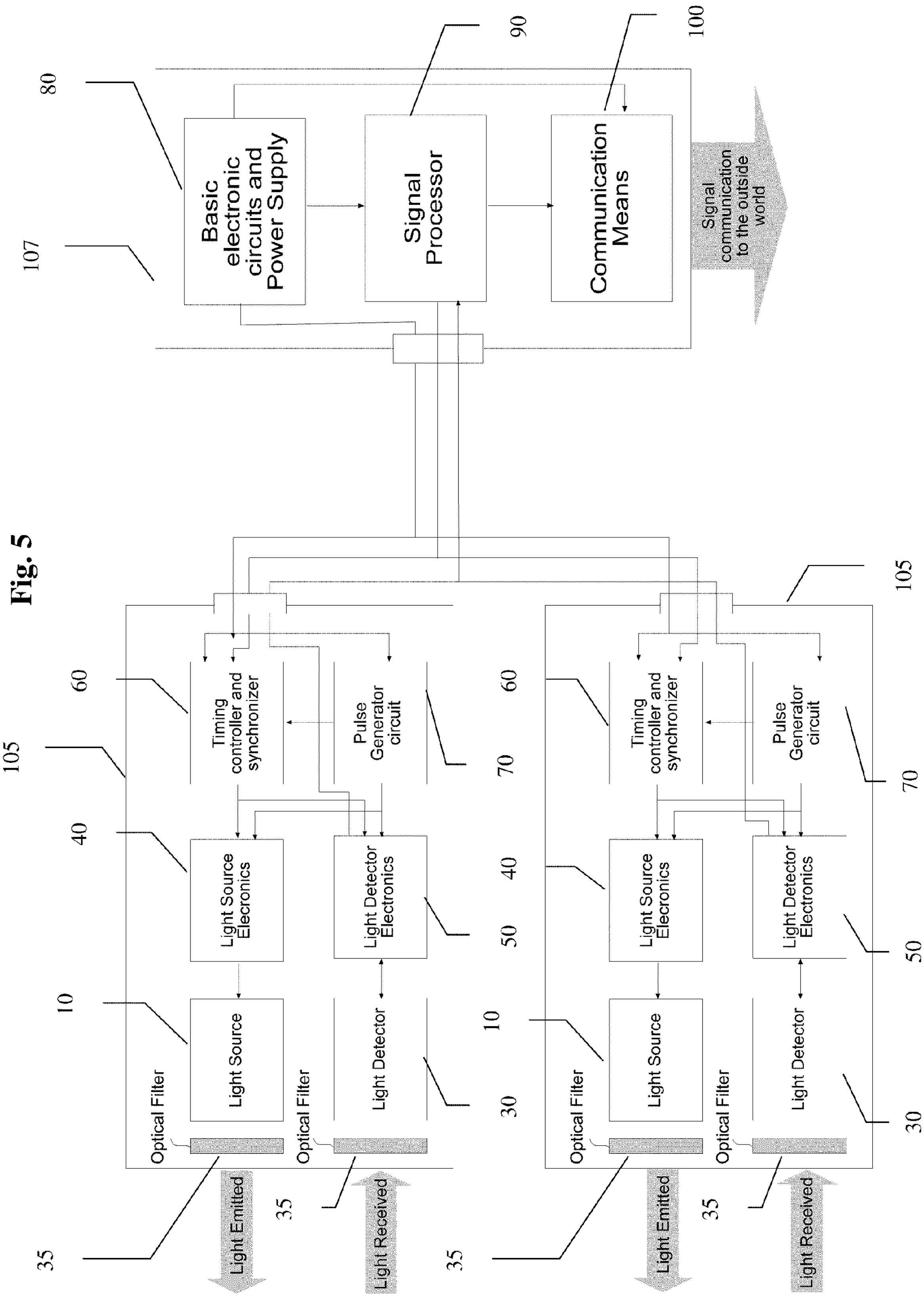
FIG. 5 is block diagram of an embodiment of a security system of the invention wherein two separate sensing units communicate with a single processing and communication unit.

In another embodiment of the present invention, a security system is constructed by two or more units. FIG. 4 shows a configuration of the system made of a separate sensing unit 105 communicating with a separate processing and communication unit 107. It is also possible for two (or more) sensing units 105 to communicate with a single processing and communication unit 107, as shown in FIG. 5.

Figures 6, 7:
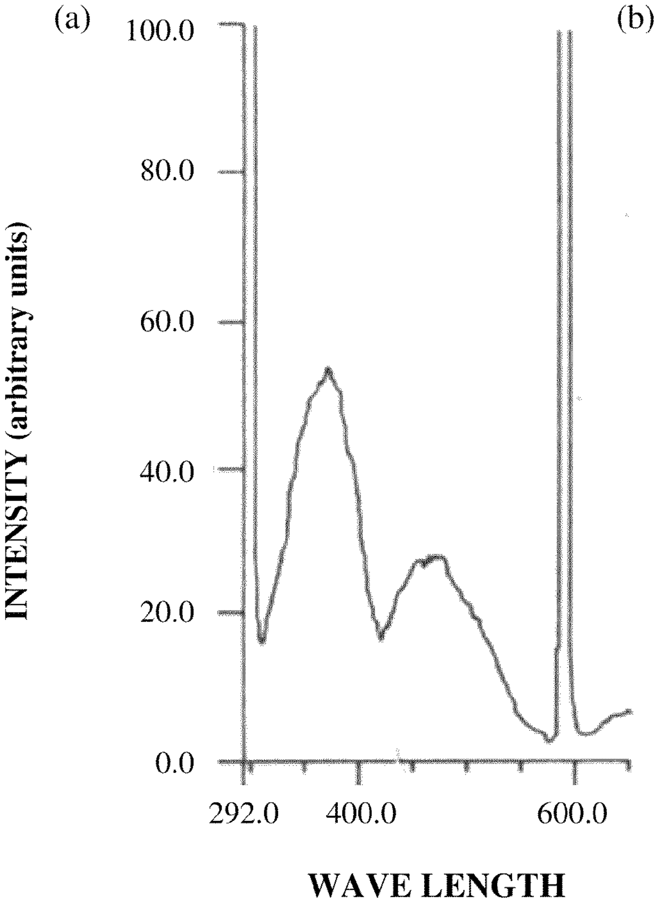
FIG. 6 is a fluorescence peaks table with some examples of values illustrating how to improve the signal quality in relation to background light, as demonstrated also in FIG. 7.
FIG. 7 is a graph illustrating the usage of a fluorescence peaks technique. In this example it can be seen that the light source emits light at wavelength 292 nm, and a narrow band filter that transmits only wavelength 366 nm in front of the detection sensor blocks the background at different wavelengths than the filter including stray reflections from the source light itself, collecting only the light reflected from the eye and thus improving the signal to background.

In yet another embodiment of the present invention, a fluorescence technique is used to improve the signal-to-noise ratio. FIG. 6 shows a fluorescence peaks table wherein the light source's 10 excitation is in one wavelength while the emission from the retina back to the light detector 30 is in another wavelength, so that the light source 10 emits in one wavelength and the light detector 30 will capture another wavelength. This helps eliminate the background noise from the emitted light source 10. A drawback of this method is that in many cases the intensity of the fluorescence peaks is not strong enough, and thus the captured signal is not of good quality in order to detect eyes. However, if in such a case it is possible to use a signal integration method, the resulting signal may be of adequate quality since the background is of a different wavelength, and processed by an appropriate optical filter 35.

UV Fluorescence—the preferred values for UV fluorescence are between 200 nm and 400 nm. The light source 10 uses a single wavelength between 200 nm and 400 nm, and the returned light from the blood vessels is of a higher wavelength due to the fluorescence effect. When using a light source 10 in the UV spectral range special care should be taken in order to keep safety conditions and this range should be used to applications where the exposure is confined to limited time, since the influence of this range to the eye safety is accumulative.

Return from the Retina—When calculating the transmission through the ocular components together with the reflection from the retina, as can be easily found in the literature based on in-vivo and in-vitro experiments performed on human and animal eyes, one concludes that the locally optimized spectrum ranges are 850-920 nm and 1050-1150 nm, and around 1300 nm. Alternative ranges that can be used by the invention include but are not limited to: 200 nm to 1600 nm, 700 nm to 940 nm, 1050 nm to 1150 nm, or 1300 nm to 1450 nm. Generally, the return from the retina is valid and operational from 300 nm to 1400 nm.

Return from the Cornea—the valid spectrum is between 300-2500. In 1450 nm there is better reflection performance FIG. 7 shows an example of the fluorescence technique where the light source 10 is emitted with a wavelength of 292 nm and the light detector 30 captures higher wave lengths such as 370 nm, 470 nm or 600 nm or all these values together. These values are brought for illustration purposes and other known values, or values discovered in the future, can be used in the invention. Another example of fluorescence technique values not mentioned in FIG. 6 is excitation by a light source 10 at 787 nm and emission/reflection back from the eye at about 815 nm.

Figure 8:
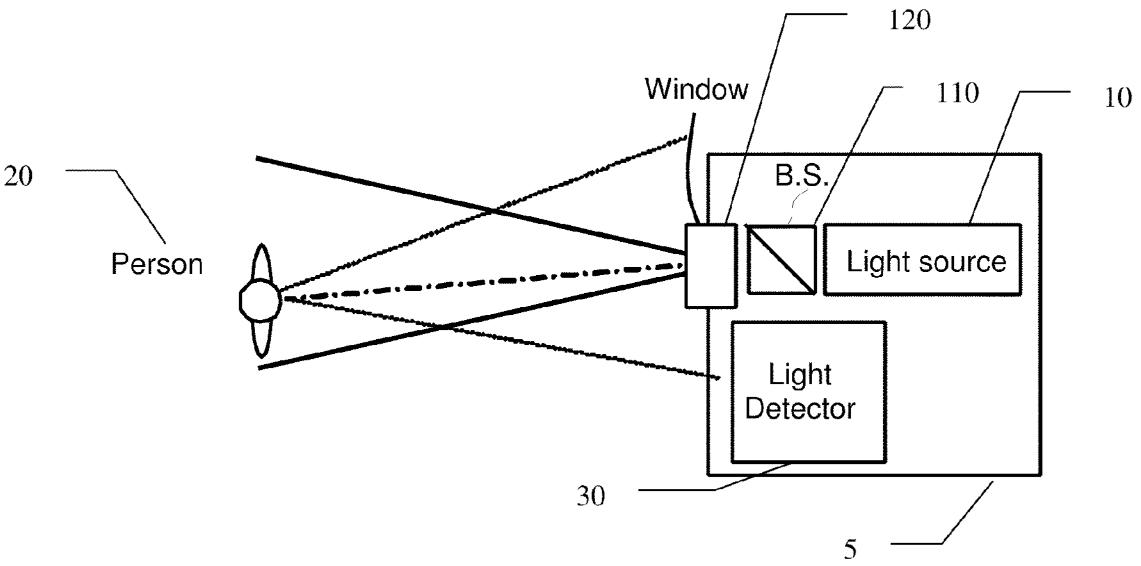
FIG. 8 illustrates an embodiment wherein the light source and detection applications are aligned in a collinear line of sight with the aid of a beam splitter (B.S.)

FIG. 8 illustrates an embodiment wherein the light source 10 and light detector 30 are aligned in a collinear line of sight with the aid of a beam splitter (B.S.) 110, thus improving the signal to noise and signal to background ratios, since the reflection is directed in an optimal way to the light detector 30. The invention can use any beam splitter know in the art such as a polarizing beam splitter, dichroic beam splitter etc. The beam splitter 110 is typically placed between the light source 10 and an optional protective window 120.

Figure 9:
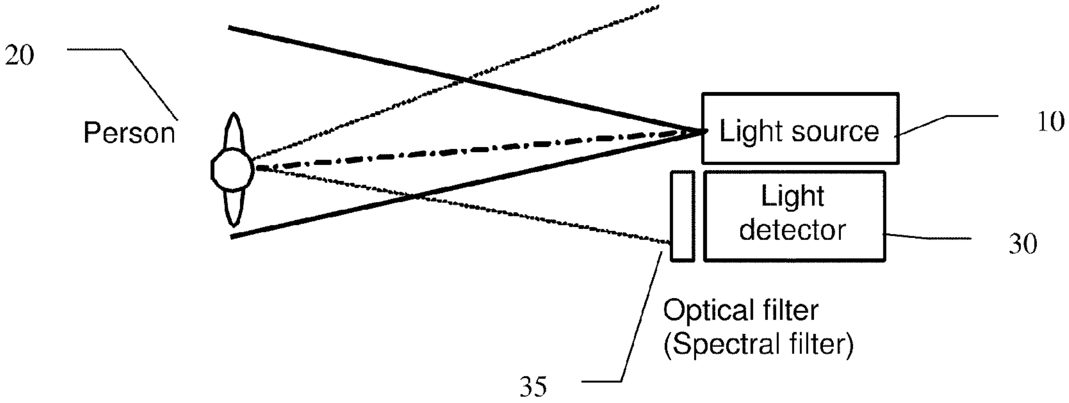
FIG. 9 illustrates an embodiment wherein an optical filter is added to the setup shown in FIG. 1.

FIG. 9 illustrates an embodiment wherein an optical filter 35 (such as a spectral filter) is added to the setup shown in FIG. 1 before the light detector 30. The light source 10 used is a spectrally narrow light source 10. The use of an optical filter 35 such as a spectral filter discriminates unwanted background radiation that is present in the field of view. In addition, unwanted background radiation can also be eliminated by a narrow time light source which is synchronized with the light detector 30 exposure time. Both unwanted background radiation elimination methods can be used separately or combined together for better discrimination results. Examples of spectral filters include but are not limited to: a band pass filter, band stop filter, interference filter, short wave filter, long wave filter, AOTF filter or any mechanical, electrical or electro physical mechanism that can cause a spectral modification of the incoming light.

In another embodiment of the present invention, the wavelength between the light source 10 and the light detector 30 are made to correspond and the spectral filter of the light detector 30 is of a similar, narrower or greater wavelength than the spectral filter of the light source 10 in such a way that optimal performance is achieved.

Another way of using a single light detector 30 and still forming a two-dimensional image of the reflected light coming from the people 20 is by transmitting a narrow divergence light beam from the light source 10 and receiving the reflected light by a single light detector 30 with a narrow field of view corresponding to the divergence of the light source 10. The light is transmitted and received in such a way that the transmitted beam and the received light are scanned over the person 20, for example, in a raster mode, so a two-dimensional image is built from the reflected light.

The limitations mentioned before regarding a single light detector 30 are valid when the single light detector 30 and emitted light source 10 are static. They do not refer to instances comprising scanning transmission and collection of light.

Figure 10:
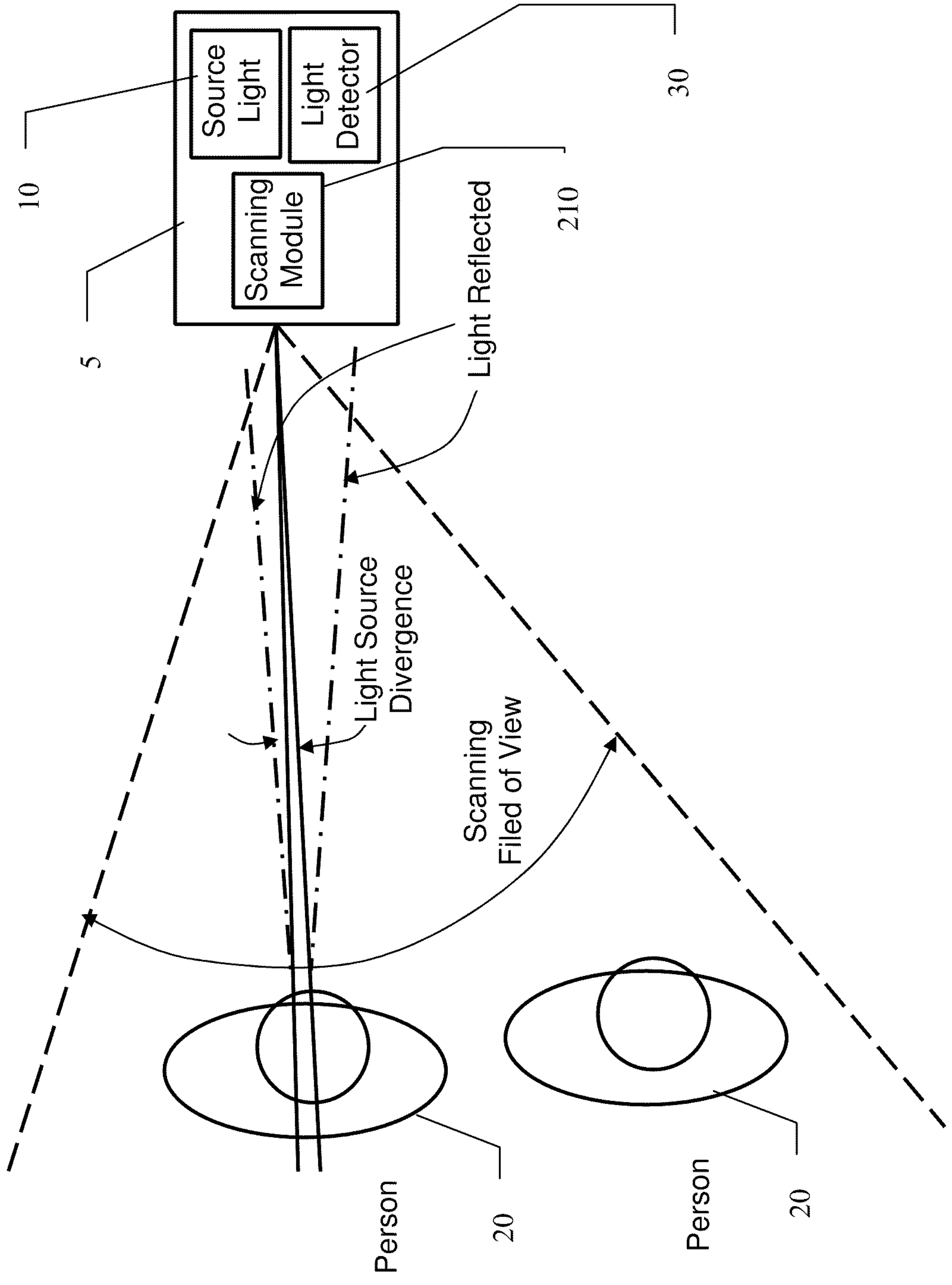
FIG. 10 is an embodiment similar to that of FIG. 1 wherein the system of the invention comprises a scanning module.

FIG. 10 illustrates a configuration similar to that shown in FIG. 1 further comprising a scanning module 210. The embodiment consists of a light source 10, a light detector 30 and a scanning module 210, all together incorporated into a single security device 5. A light source 10 emits a narrow light beam divergence directed towards the location and the light reflected from the people 20 and from the surroundings is collected by the light detector 30. The instantaneous field of view of the light detector 30 collects light within a cone whose base is the same area illuminated by light source 10. The scanning module 210 scan the mutual cone of light emitted by the light source 10 and of received the light of the light detector 30 in such a way that both move together over the field of regard. In this way, once all the received reflections from each instantaneous field of view are collected, they can be joined together into an image similar to the image formed in the example of FIG. 1. The image built then reflects the image of the field of regard that includes the reflections of the different people 20 that are present in the field of regard. FIG. 10 shows an arc marked as scanning field of view. This scanning field of view represents the top view of the field of regard, and the scanning in this example is horizontal. In order to complete the collection of the reflected light from the whole field of regard a scanning of the vertical field of view is also required.

The scanning is performed with the help of the scanning module 210 that are controlled by a scanning control electronics module (not shown).

Figure 11:
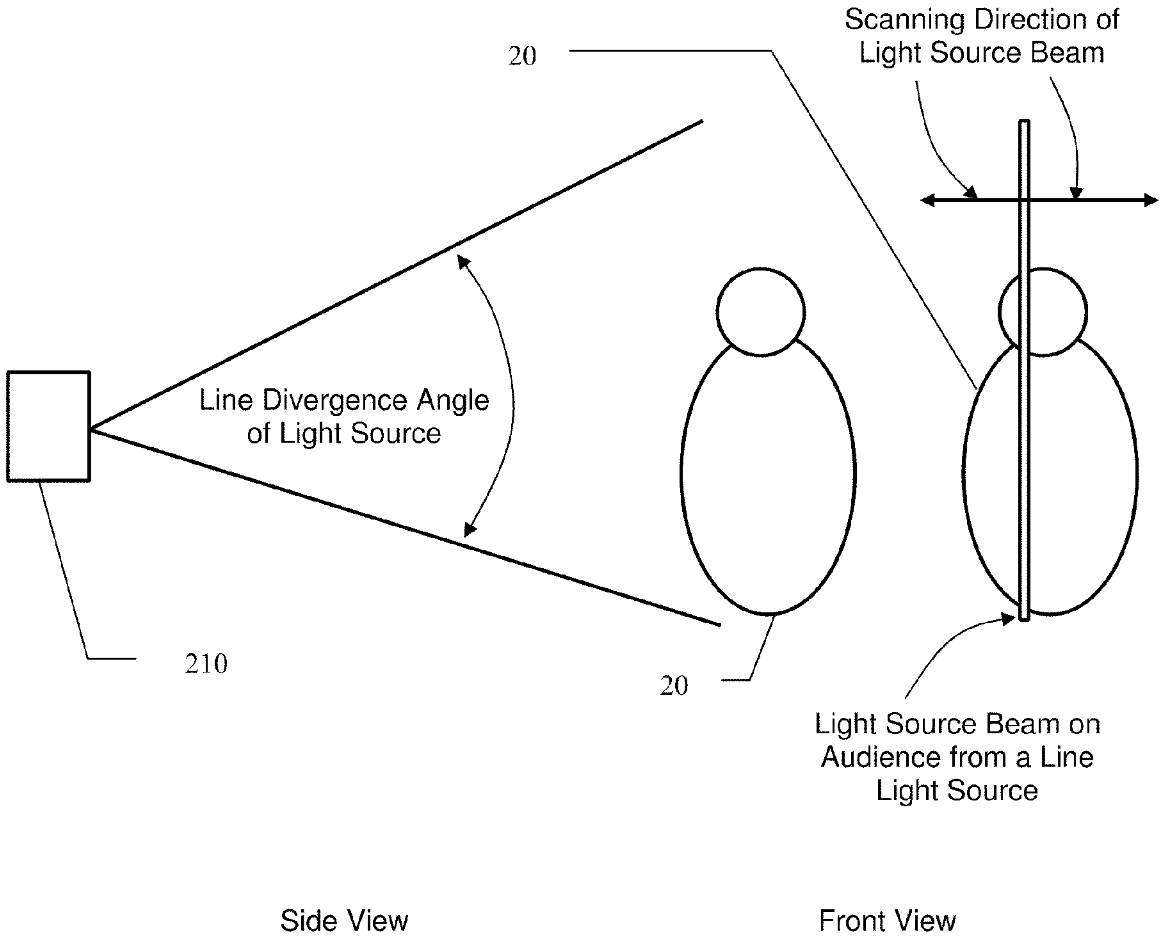
FIG. 11 is an embodiment similar to that shown in FIG. 11, wherein the scanning is performed only in one dimension (horizontal).

FIG. 11 is side view showing a scanning module 210 scanning a light beam coming from light source 10 (not shown) which is directed to a person 20 in the location to be monitored.

The line divergence angle of the light source 10 is shown as a span of vertical rays. In this example, the light beam coming from the light source 10 consists of a cone of rays with a rectangular profile, as shown in the right side part of FIG. 11.

The right side of the FIG. 11 shows a front view of two persons 20. In this example, the light beam is a beam with a very narrow rectangular shape. This rectangle covers all the vertical area of the persons 20 and the narrow part is scanned horizontally as shown by the arrows.

Since the light beam is a line then in order to form a two-dimensional image, only scanning in one dimension is required.

This narrow beam moves from left to right and back in order to cover the whole field of regard of the location to be monitored.

In this example, the light detector 30 should be an array of detectors arranged in a vertical one dimensional line, so they can detect with the help of optical lenses or cylindrical optics the reflected light from the location to be monitored. Similarly to the example of FIG. 10, once the line beam completes the scanning from left to right the two-dimensional image of the location to be monitored can be built.

Since the scanning allows building up a two-dimensional image of the location to be monitored, all other mentioned capabilities of an array of detectors, can also be achieved by scanning, for example, measuring the PD (Pupillary Distance). The build up of a two dimensional image is not essential, since it is possible for each angle position of the scanning angle to detect the returned light from the eye. Then, it is possible to define from the angular position where the detected eyes are located, thus deducting whether a person with open eyes is present. In this way, the signal processing may be simplified and a storage memory for the two dimensional image in not required.

An additional advantage of the scanning method is from the safety point of view, since the light beam is not static and constantly moves across the different parts of the field of regard (the field of regard can be determined as the field of view of a corresponding field of view of a two dimensional array). As a result, since the energy density should be the same for a static or scanning light beam, then in the scanning method the exposure of the eye per unit time is lower than in a static mode.

Scanning further presents some additional advantages including but are not limited to: the people can be located closer to the light sources without endangering the people's eyes; the intensity of the light sources (i.e. LED'S) may be much lower; the heat dissipation of the light sources is lower; the validation of the eyes detected is easier since in a narrow field of view the number of candidate eyes is maximum one to two pairs; the intensity applied during scanning can be varied and adapted according to the environment to be scanned unlike in a single capture where the intensity has to be maximized to the farthest distance to be captured; the uniformity of the light source is better in the narrow FOV than in the large FOV.

A disadvantage of the scanning method is that a scanning module 210 must be added to the module in order to perform the scanning. The scanning module 210 must also operate in a synchronized way if different scanning modules 210 are used for the light source 10 and for the light detector 30. The synchronization can be avoided when combining the line of sight of the light source 10 and the light detector 30 field of view with a beam 110 splitter as shown in FIG. 8. In that case, a mutual scanning module 210 is used for the scanning operated on both light emitted and light received.

The scanning module 210 can be, for example, a mirror with motors that control the moving of this mirror in two orthogonal angles, it can be done by using a Radio Frequency (RF) controlled acousto-optic deflection device, by using two wedges and rotating them separately and similar devices, or by any other method that is used in the art in order to deflect a light beam and thus enabling scanning of the light beam.

Figure 12:
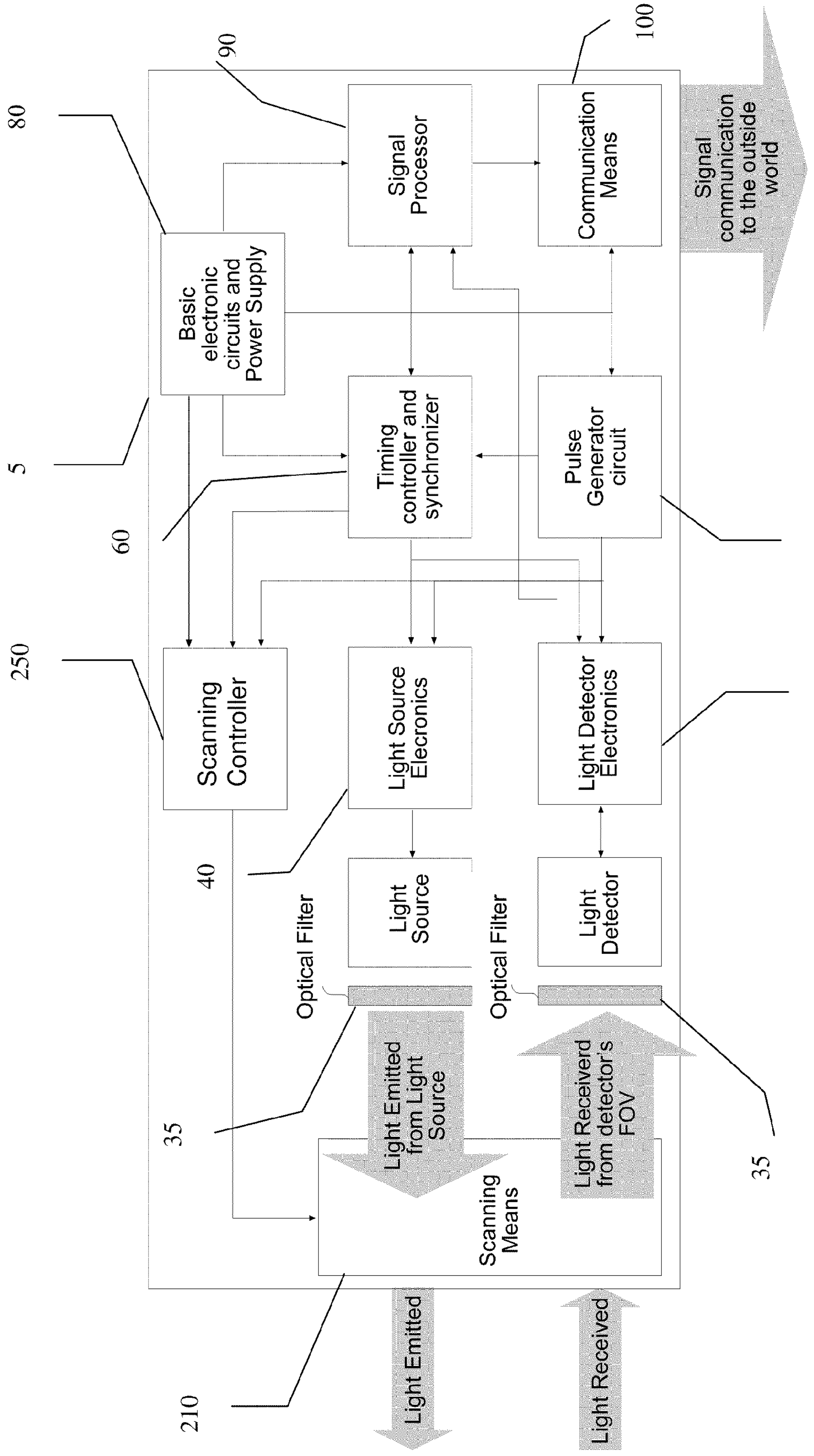
FIG. 12 is an embodiment of the invention similar to FIG. 3 further comprising a scanning module.

When using a scanning method, then the embodiments shown in FIGS. 3, 4 and 5 should be slightly modified so a scanning sub-module is added, for example, as shown in FIG. 12. In addition, a scanning controller 250 (scanning electronics or control unit) for driving the scanning module 210 should be added and this control box should be managed according to the outputs from the image processing box and the signals generated by signal generator should be provided also to that control electronics so the building of the two dimensional image should be done correctly.

Another advantage of using the scanning method is when employing wavelengths that are not compatible with silicon detectors. A cost effective alternative to using silicon two-dimensional arrays of detectors, is by using a single light detector 30 of GaAs family and exploiting the method of scanning synchronously the beam from the light source 10 together with the instantaneous field of view of the single GaAs light detector 30. Wherever a light GaAs detector 30 is mentioned, this is done as an example and other detectors may be used that are also able to detect wavelengths that silicon detectors are not able to detect or the detection is done by the silicon detectors with low efficiency.

A further advantage of the scanning method is that when a very large field of view is required, then two-dimensional arrays may be limited by the size and or resolution, while by using the scanning method a module, device or system can be designed to match each special field of view and resolution as well.

Once an image is formed with the scanning method, it can be exploited as any other image described herein. For example, if the mentioned formation of the image needs to be done at different wavelengths in one embodiment, then several light sources 10 may be used and these light sources 10 should be combined together in the security device 5, as well as several single light detectors 30 may be used each of them with a corresponding spectral filter.

In one embodiment, shown as a non-limiting example, the scanning system comprises a light detector 30 such as a camera, a light source 10, a scanning module 210, a scanning controller 250 and a processing unit.

The scanning module 210 can comprise a mechanical bracket, a scanning motor, one or more light sources 10, one or more light detectors 30, and a scanning driver. Typically, the mechanical bracket moves the light source(s) 10 and light detector(s) 30. The scanning controller 250 comprises an electronic driver for the light source(s) 10 and an electronic synchronization driver. The scanning controller 250 times the movement and operation of the one or more light sources 10, one or more light detectors 30.

The light detector 30 may be a simple board camera preferably optimized to detect in the NIR spectrum, where the illumination will not disturb the people's 20. The camera 30 comprises optical lens and a spectral filter 35. The optical lens should be adapted according to the illumination divergence so the illuminated area is seen by the field of view (FOV) of the camera 30. The camera 30 FOV shall be defined small enough so the detection can be done but also large enough so the scanning can be effective and the scanning time shall be not prohibitive. For example, if the camera 30 sensor is in a ⅓" format (i.e. 6.4 mm×4.8 mm) then using a lens with 25 mm focal length then the camera 30 FOV in the lateral orientation shall be approximately 14 deg while in elevation the FOV is approximately 11 deg. A different option is to rotate the rectangular sensor by 90 degrees so then the large size is oriented to the elevation and the short size to the lateral or horizontal position. This may be useful when it is required that a larger vertical FOV while the azimuthal is in any case covered by scanning. Then in order to scan a field of regard of 120 degrees, it will be necessary to stop at least 9 stops when no overlap is required. If some degrees of overlap between adjacent shots are required then the number of stops will increase accordingly. These are tradeoffs that should be taken in account when calculating the total scanning time consumed. The scanning time is also a function of the integration time in each stop and how many frames are grabbed in each stop. One, for example, may want to integrate several images in order to receive an average desired image. And if the integration time is less than the time defined by the frame rate then the frame rate may be raised in order to spend less time on each frame. For example, standard cameras 30 work at 25 or 30 Hertz, which means that the integration time of the frame is 20 milliseconds or 33 milliseconds correspondingly. If the capture is performed with an electronic shutter of 15 milliseconds length then 5 milliseconds of 18 milliseconds are spent without use. So the frame rate of the camera 30 can be increased in order to optimize the time used. This assumes that the time needed for the image-processing calculation can be neglected comparing to the integration time and the algorithm calculation time is not the bottle neck.

The common sensor formats may be ¼", ⅓" and ½". There are larger and smaller formats and them also can be used. The definition of the sensor format should be part of the system tradeoffs since it can influence the performance from one hand and also the cost from another hand. Generally larger formats are more expensive but each pixel is also larger so it can collect much more photons, while actually smaller format are being made with higher and higher resolutions which means that the pixel areas are smaller and smaller.

The focal length used may be also larger and shorter than that presented in the example, for example, one can use a smaller focal length like 16 mm or 12 mm, then the Camera 30 FOV will be greater.

The common rectangular sensor arrays of light sources 10 are CCDs and CMOS detectors. These common sensors have standard resolution like VGA (640×480) and also better. The advantage of working with the lower VGA resolution is that the CPU time (processing time) used by the algorithm will be less than when working with higher resolutions allowing the scanning module 210 to scan faster.

These sensors are silicon technology devices and are suitable for applications working at spectral ranges less than 1100 nm in the NIR spectrum. Other technology sensors may be used if the higher spectral ranges are used, for example in order to detect eye reflections up to 1600 nm (SWIR wavelengths). These technologies are much more expensive than the common silicon technology. Also new technologies like germanium impurities implanted into silicon substrate may be used for SWIR wavelengths.

The illuminating light source 10 should be preferable in the NIR spectral range compatible with the lens optical filter 35. It may consist of a single light source 10 or a multiple light source 10 configuration. This light source 10 is preferably a LED NIR source but it can be any other source as well. The advantages of the use of a LED source are its higher electrical efficiency because of its spectral emittance in the specified spectral range. If, for example, an incandescent lamp is used then also a spectral filter 35 should be used to illuminate only in the required spectrum. A laser diode may also be used although it is less cost effective then using a LED. If the illumination is assembled with a single light source 10 then it should illuminate the same FOV like the camera 30 FOV, so every image point grabbed is illuminated. When using a multisource illumination, each light source 10 may illuminate a different portion if the image in the FOV of the camera 30 thus achieving the full FOV illumination. In general, using multisource illumination 10 allows to receive a better uniformity in the illumination. So as in the previous example, if the horizontal FOV is 14 degrees, then the illumination source 10 should be aligned in a mechanical bracket so they cover an illumination angle at least like the imaging FOV. It has to cover also the vertical 11 degrees FOV.

Both the camera 30 and illumination source 10 should be assembled in a mechanical bracket so it can be rotated in order to achieve the scanning movement. If the illumination consists of multiple light sources 10 then the bracket shall be prepared so the right orientation of each light sums into the overall vertical and horizontal FOV. The overall panoramic lateral field of regard (the 120 degrees) is thus captured by the scanning operation.

The mechanical bracket with the camera 30 and the light source 10 on it are joined to a motor. Different kinds of motors may be used, like a step motor, Micro-Electro-Mechanical Systems (MEM's) technology, or any other kind of available motor in the industry. The motor is operated with the use of an electronics driver which may be controlled by a microprocessor such as an 8051 microprocessor.

The synchronized operation of the motor, the camera 30 shutter and the illumination timing is controlled with the help of a microprocessor 90. Although in a synchronizing method of operation it is assumed that the illumination is pulsed, it is possible to operate the scanning at a Direct Current (DC) level of operation, i.e the light source 10 is illuminating all the time with no pulses while the camera 30 grabs the images without synchronizing. The motor is driven to move from one stop to another and after a predefined delay allowing the camera 30 enough time for grabbing an image, the motor moves the camera 30 to its next grabbing position.

Another possible operation of the scanning is by using a different motor, for example, a DC motor, where the camera 30 is constantly moving, and every time the camera 30 reaches the right position the shutter is opened. In this mode it is important that the shutter is opened for a very short time so the image is not blurred by the scanning movement. The shutter time can be derived from the scanning velocity in such a way that the shutter time should be less than the time it takes the camera to move the angle subtended by a single pixel. For example, if the horizontal pixel size is 0.01 millimeter (mm), then if the velocity is 10 degrees/second then the shutter should be less than 2.3 milliseconds, this assumes the same focal length than before 25 mm.

The panoramic lateral field of regard is arbitrary and limited by the mechanics so it can be designed according to the application needs. In principle it can be 360 degrees, but in that case special wiring methods should be implemented.

The more common field of regard is up to 180 degrees, so the motor can be run back and forth and standard wiring should be applied with common methods like those used with printing machines.

The field of view is defined by two parameters the sensor format size and the lens focal length. Using a large sensor allows to use larger focal length in order to keep the same FOV as a small sensor format with a lens which has a shorter focal length.

One additional advantage of the scanning method is from the safety point of view. Since the field of regard is illuminated only when the scanning module is aiming to a certain specific direction, then the people 20 located at that direction is exposed only on those specific moments. Otherwise if no scanning method is used and the whole field of regard is viewed as a single field of view then the illumination power should be much greater in order to illuminate simultaneously the whole 180 degrees and every person in the people 20 is exposed all the time. Using a scanning method of the invention, the exposure is reduced to only when the camera 30 is aiming at a specific position. On the other hand, since the light detector 30 sensor is a similar (in both scanning and static methods) then each pixel in the sensor looks at a much smaller area in the object thus receiving much less light. So in order to be able to detect eyes efficiently, higher illumination levels are needed and these levels will either be elevated above the safety limit in order to reach to the required levels for detection or limited to the allowed safety levels so the detection performance is degraded.

The electronic drivers for scanning, for illumination and for synchronization are similar to those described above.

In another embodiment of the present invention, the optics of the camera 30 may include in addition to the spectral filter 35 and the lens also polarizing means that when assembled correctly they may eliminated unwanted reflections which disturbs the image causing better detection algorithms to discriminate the eyes from the whole picture. One linear polarizer is located in front of the illumination source 10 with the polarization axis vertical (for example) and another linear polarizer is located in front of the camera 30 lens with its polarizing axis horizontal (if the illumination 10 polarizer was at horizontal orientation, then the camera 30 polarizer would be at a vertical orientation). Then reflections from the cornea and from spectacles and from any other shiny surface in the room will be eliminated since its reflection preserves the polarization orientation. Since the eyes reflection from the retina only partially preserves polarization then it will be still possible to detect the eyes.

A different approach to the above can be done if the illumination source 10 is already linearly polarized, then only one polarizer is needed in front of the camera 30 lens, and its orientation should be orthogonal to the illumination polarization orientation.

Other methods for eliminated parasitic reflections from surfaces in the image are algorithmic methods that may be based on a single non polarized image, a polarized image or simple image subtraction between to images grabbed under slightly different illumination conditions.

The algorithm methods that are used on non manipulated images look for special reflections like "nice" circular" stains or blobs in the picture with high grey level intensities. These blobs are then compared to the average value of their surrounding image in order to eliminate "un-normal" picture areas.

Other algorithms may be based on manipulated images based on the subtraction of two imaged exposed under slightly different illumination conditions. In this case, since the bright pupil reflections as explained above is more intense when the light source 10 and the camera 30 are coaxial, one can purposely illuminate in a non coaxial way and when compare to the coaxial way of illumination then the most significant difference between these two pictures will be those part of the picture which are sensitive to the coaxial/non coaxial illumination. All other parts which are not sensitive will appear similar and by subtracting the non coaxial image from the coaxial image will leave only the eyes detectable ("above the water"). Preprocessing may be required on each image before the subtraction in order to remove minor special noise.

In this method it is important that the two pictures (the coaxial and the non coaxial) should be grabbed as close (in time sense) as possible since any arbitrary movement will be enhanced by the subtraction. On the other hand it is not acceptable to ask the people 20 not to move. It is thus sensible to use if the exposure time is short enough to use higher frame rates, so the time interval between the frames is limited by the shutter.

Another method of image subtraction is to take advantage of eyelid blinking. By grabbing many consecutive frames once a blinking of the eyelid occurs then by subtracting the blinked image from the regular image the only difference between these images will be the appearance of the bright pupil of the non blinked image so any other feature in the image will disappear leaving only the eyes in the scene.

When dealing with images of persons with spectacles, it may occur from time to time that one of the bright pupils of the person is hidden behind a spectacle circular reflection from the spectacle. This may happen for direct and straight gaze of a person wearing glasses into the camera. This kind of disturbances may be avoided by placing the device quite aside from the TV set so there is no chance that the person will look directly to the camera.

Scanning can also be helpful in such cases when the scan is planned in such a way that image overlapping is obtained in adjacent stops of the scanning motor. When image overlap occurs then the person appears in more than one picture. More than that, the person will appear in different locations of the picture, and since in one picture the person may appear looking directly to the camera 30 in one stop, once the camera 30 with the motor moves to the next stop then with the illumination source 10 moved aside together with the camera 30, then a different reflection angular situation is formed. Thus if in one picture the bright pupil was hidden behind a spectacle reflection, then in the overlapped image it will be expected that the bright pupil will appear again.

In yet another embodiment of the present invention, the system of the invention is used for measuring the Pupillary Distance. Pupillary Distance is the distance from the center of the pupil (black circle) in one eye to the center of the pupil in the other eye. This measurement is used by optometricians to accurately center the lenses in the spectacles' frame. Typical adult's Pupillary Distance measurements (PDs) are from 54 to 66 millimeter. Typical children's Pupillary Distance measurements are from 41 to 55 millimeter. The reflection from the retina is higher in case of young people and lower for older people. It is obvious that when the light detector 30 is composed of a single light detector 30 or an array with a low number of detectors then it is not possible to measure the distance between the eyes (PD) and it is impossible to separate eyes. Instead, the counting is done by detecting the accumulated energy that each eye contributes in comparison with the contribution from the background signal.

In general, it is possible to differentiate between adults and children assuming they sit at the same distance. PD can also be used to estimate the age of each viewer. The amount of reflected light received by each eye can also be used in order to estimate the age of each person 20 in the location to be monitored.

In another embodiment of the present invention, the presence of one or more persons 20 is detected by capturing the reflection from uncovered body skin after comparing it to the background scene. The system may learn the reflection from the background, for example, by calibration of the system during the installation or by an auto-calibration method that tracks the changes in the reflected light. For example, a single light detector 30 is used as the light detector 30 and during installation a technician calibrates a threshold potentiometer that measures the background level of the reflection according to that level the system recognize when a person is present according to the change in that predefined signal level. According to the changes it is possible to estimate how many people 20 are currently in a location that is monitored according to the invention.

In another embodiment of the present invention, the system monitors a driver of a car, truck, train or any other transportation mean to verify that the driver has not fallen asleep. The system of the invention continuously monitors the driver to make sure that reflections are being received from the drivers' eyes, meaning the driver is awake. If the eyes are not detected and the vehicle is in motion, it means that the driver has great chances of being asleep. An immediate alert, by sound, light, vibrations or any combination thereof can be immediately set so that the driver wakes up immediately.

Figure 13A:
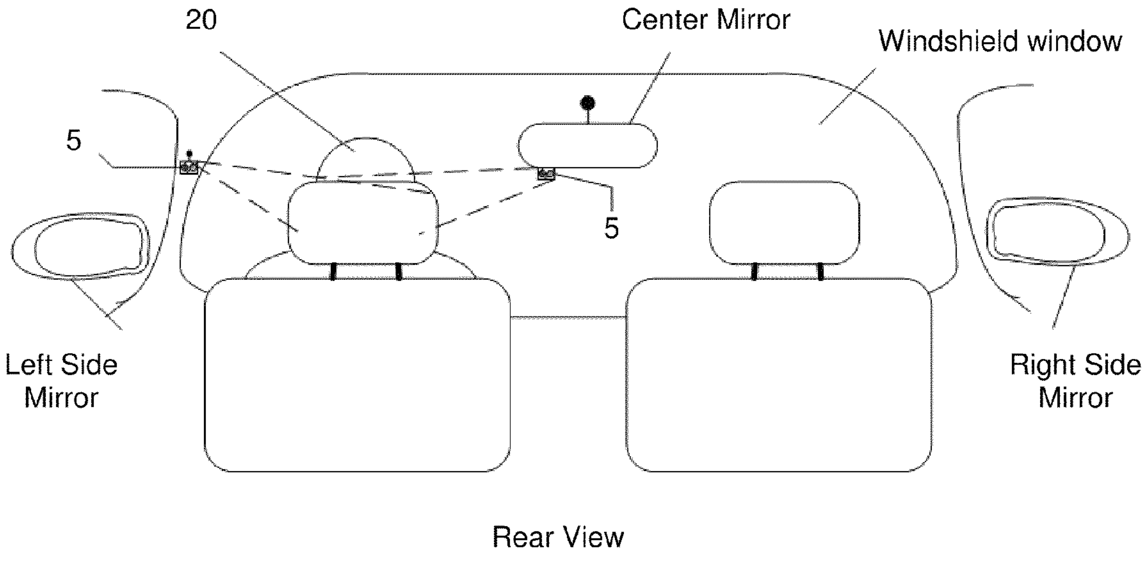
FIGS. 13A, 13B illustrate an embodiment in the area of driver safety, wherein an alert is issued if the driver closes his eyes for more than a predefined amount of time.
Figure 13B:
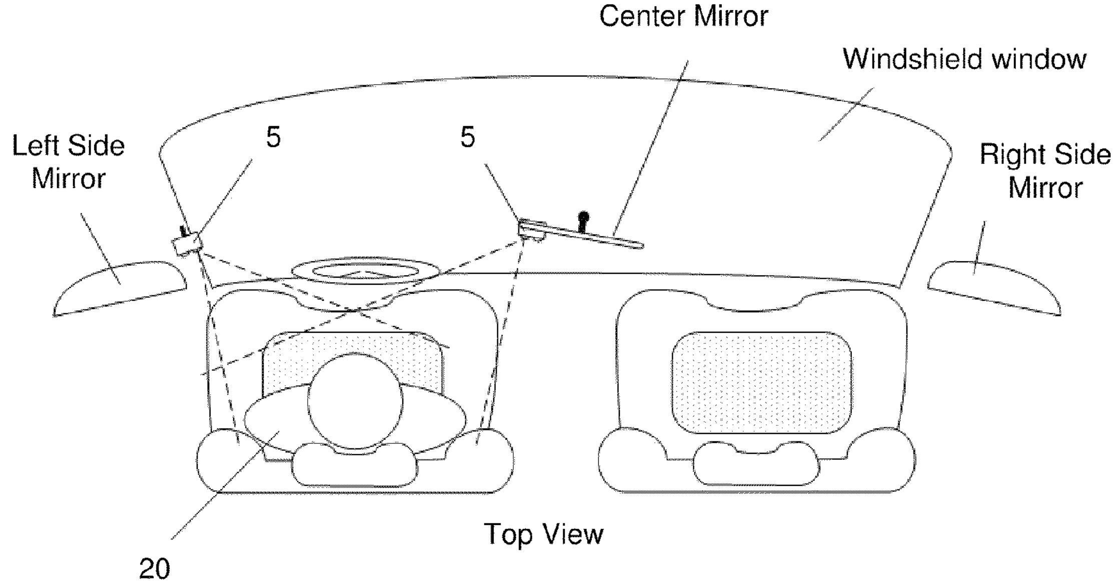

FIGS. 13A and 13B illustrate an embodiment of the present invention in the area of vehicle safety, and in particular as an alert system for alerting the driver 20 if he falls asleep and his eyes close suddenly. FIG. 13A is a read view of one an in-vehicle settings example, while FIG. 13A shows the same setting from a top view. Two security devices 5 are placed in front of the driver 20. In this example, one security device 5 is located under the main mirror in the center and the second security device 5 is located to the driver's 20 left side on the left side of the windshield. It is also possible to use only a single security device 5 though increasing the number of security devices 5 assures better coverage of the driver's 20 eyes.

The example in FIGS. 13A and 13B shows a configuration that assures that the eyes of the driver 20 are within the field of view of one of the security device 5 even when he turns his eyes to the left or to the right, for example, when checking on one of the side mirrors. This is achieved by the two security device 5 so also when the driver 20 looks to the right side mirror, turning his head to the right, the security device 5 located under the mirror in the center of the windshield still detects his eyes and thus the system will not produce a false alarm eventhough the left security device 5 does not detect the eyes. The same applies when the driver's 20 eyes are directed to the left side mirror and thus are only detected by the left security device 5. The system also includes devices and applications for assessing the vehicle's velocity so that if the vehicle stops, for example, at a traffic light, if the driver 20 closes his eyes (or turns backward) no alert is issued. The devices and applications for assessing the vehicle's velocity can include independent velocity sensors or a connection to the vehicle's internal systems or engine.

If the driver's 20 eyes are not detected for a predetermined amount of time an alert is issued. The amount of time between the time that eyes closed are detected and the time an alert is issued (assuming the eyes haven't opened in between) can be either fixed or variable. In one embodiment, the amount of time before an alert is issued decreases as the vehicles velocity increases, so at higher speeds the alert is issued faster since at higher speeds any false maneuver by the driver 20 has higher consequences.

Figure 14:
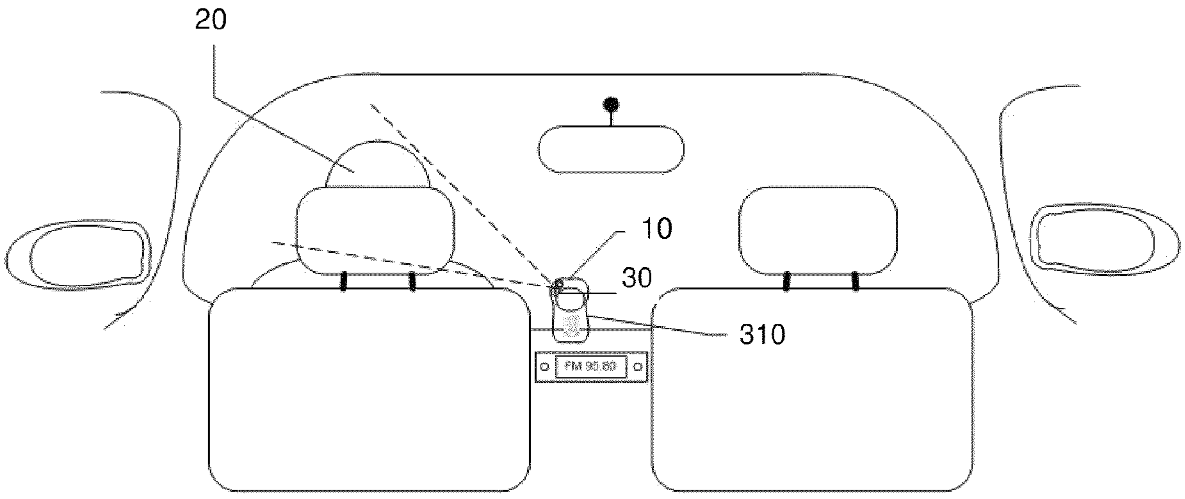
FIG. 14 illustrates another driver safety embodiment similar to FIGS. 13A, 13B, wherein the alerting system is incorporated inside a personal or car cellular/mobile phone.

FIG. 14 shows another embodiment of the previous example (car safety alert system) wherein the electro-optic module is incorporated in the personal or car cellular/mobile phone 310. The system can be miniaturized and installed in a mobile phone 310. The light source 10 illuminates the driver's 20 eyes and the reflected light from his eyes is collected by the detector 30. Both the light source 10 and the light detector 30 are integrated into the mobile phone 310. If the mobile phone 310 has Geographic Positioning System (GPS) capabilities, then this feature can be used for velocity monitoring. It is possible to use the mobile phone 310 in conjunction other security devices 5 as illustrated in FIGS. 13A and 13B.

The pupil diameter varies with drugs and alcohol consumption and the rate of variation also changes when a person or driver 20 is under the effect of drugs or alcohol. Thus the system of the invention can also be used to monitor if a person or driver 20 has consumed alcohol or drugs. If the pupil is very small compared to normal diameter at a defined illumination then the security device 5 can give an alert for drugs or alcohol consumption. Such system installed in a vehicle, for example, can disable the ignition system if the driver is considered to be under the influence of alcohol or drugs. The same system can also be used to screen people at certain sensitive locations such as night clubs, football matches or any other event where violence among attendees can occur.

Figure 15:
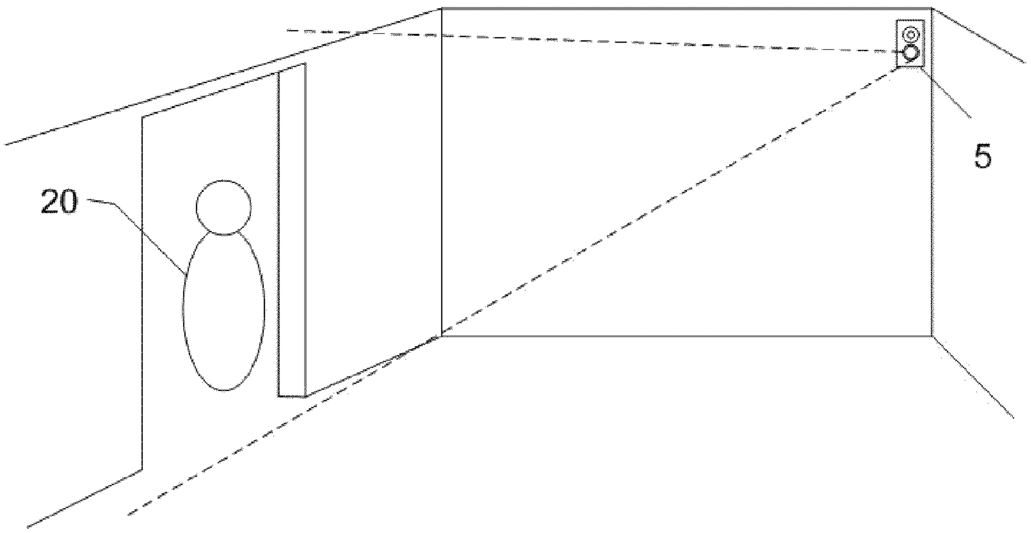
FIG. 15 illustrates an embodiment of an indoors alert system for alerting when a person enters a predefined zone.

FIG. 15 illustrates an embodiment of an indoors alerting system. The security device 5, is located in front of entrance such as a door or a window of a room, house, business, factory, or any other location to be monitored. Additional security devices 5 can be placed in additional places, such as in several corners of a room, in order to increase and improve the field of view directed to the entrance. The security device 5, detects the reflection from the intruder person's 20 eyes and then can generate an alarm signal or communicate the information to a remote facility such as a police station, a mobile phone of an owner, etc.

The security system of the invention can be operated at night, in dark environments, indoors and also at daylight conditions. The security system can optionally be further coupled with a camera 610 that in addition to the alerting signal can also generate a picture and/or a video of the scene. The additional picture(s) and/or video taken of the scene and of the intruder can also sent to a remote location or be saved in a local storage device so it can be retrieved later for further investigation or as a proof for legal purposes.

Figure 16:
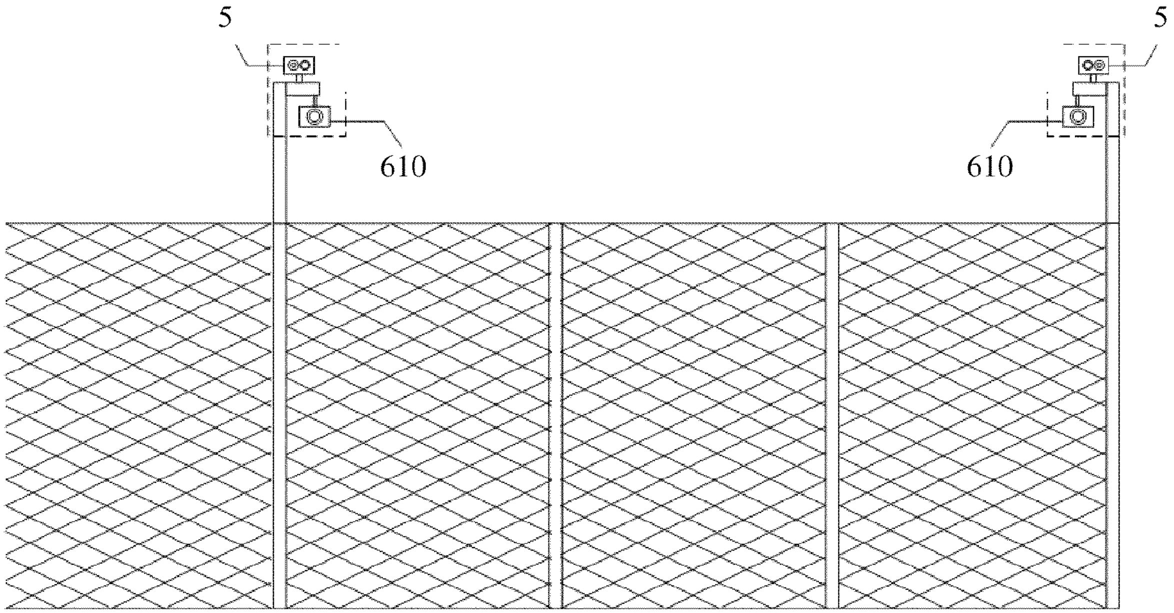
FIG. 16 illustrates an embodiment as part of a general system along fences or borders. When a person is detected by the system of the invention as getting close to the border or fence, then a common camera is activated so its picture appears on a monitor at a central control room.

FIG. 16 illustrates an embodiment of the present invention in the Homeland Security area. In this example, the security device 5 is coupled to a camera 610. The security device 5 is mounted along a fence that surrounds or separates a sensitive place, such as a police station, country borders, jails, strategic sites like airports, national water reservoirs, military camps, etc. The security device 5 detects when a person 20 comes close to the watched fence and can activate automatically the coupled camera 610 so a picture and/or video with the image of the scene in front of the fence can be sent to a visual monitor on a control room.

In a Homeland Security context, the guards in the control room can analyze the scene by the fence and according to their conclusions they can order to send a patrol to check on the detected person 20. The security system can cover any area including an entire border or fence by installing a plurality of security devices 5 mounted along the border. The control room can check more than one location simultaneously by either visualizing several images on a single monitor either by spitting the screen (thus showing them simultaneously) or by selecting a location and visualizing it. It is also possible to install several control monitors.

In yet another security embodiment, the system of the invention is placed in a watch tower or in any location where a guard, security person, military personnel, or any other person 20 with a sensitive task is located. The security system can make sure that those people 20 do not fall asleep or has not had a traumatic event. The traumatic event can be a medical event that made that person 20 lose consciousness or die. In such case, the security system can generate an alerting signal to wake up the person 20, and/or alert a remote facility. A traumatic event can also detect in the case of a border being patrolled either permanently or from time to time by a guard or sentinel 20. If the security system does not detect the presence of the guard or sentinel 20 at the time the guard or sentinel 20 is supposed to be located by the system, then an alert can be issued to a central control room. The central control room can then investigate if the situation to see if the guard or sentinel 20 was attacked or had a medical emergency etc.

In another embodiment of the present invention can be installed on an aircraft for searching survivors on land or in the sea. The system can detect a survivor if the survivor opens his eyes and is looking in the direction of the rescue aircraft.

In another embodiment of the present invention, the system can be integrated into any portable devices or systems for homeland security applications, for example, on a helmet, on a rifle near or coupled to an optical sight or to a rifle telescope, binoculars and the like such that once eyes are detected then an alert is activated so that the person with that portable device or system can focus in the direction of the detected person. The focus can also be adjusted automatically by the system.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A security system for detecting the presence of one or more persons in a location to be monitored, said system comprising:

(i) one or more light sources directed in the direction of said location;

(ii) one or more light detectors for detecting reflections of said one or more light sources from said one or more persons to form an image representing eyes of said one or more persons;

(iii) a scanning module to direct said one or more light sources and said one or more light detectors at narrow portions of said location at a time, capturing an image of said narrow portion of said location;

(iv) a mechanical bracket on which said one or more light sources and said one or more light detectors are mounted;

(v) a scanning controller for driving said scanning module, said scanning controller moving said one or more light sources together with said one or more light detectors, on said mechanical bracket, to a new position after each image of said narrow portion of the location is captured;

(vi) a joining module for combining said captured images of said narrow portions of said location to form a single image of said location; and (vii) a processing unit for analyzing said single image to identify and count the number of eyes on said single image.

2. A security system according to claim 1, further containing communications lines for communicating the analysis of the image received to a remote facility.

3. A security system according to claim 1, wherein eyes are identified by detecting reflected light from the retina or the cornea or both.

4. A security system according to claim 1, adapted for detecting survivors on land or on sea.

5. A security system according to claim 1, wherein said one or more light sources or said one or more light detectors comprise a spectrally narrow bandwidth or a spectral filter, said spectral filter comprising: a band pass filter, band stop filter, interference filter, short wave filter, long wave filter, Acousto-optic Tunable filter (AOTF) or any mechanical, electrical or electro physical mechanism that can cause a spectral modification of incoming or outgoing light.

6. A security system according to claim 5, wherein the wavelength between the one or more light sources and the one or more light detectors are made to correspond and the spectral filter of the one or more light detectors is of a similar, narrower or greater wavelength than the spectral filter of the one or more light sources in such a way that optimal performance is achieved.

7. A security system according to claim 1, wherein said one or more light detectors comprise a light detector, photodiode, an avalanche photodiode, an array of detectors, Charge Coupled Device (CCD) camera, Complementary Metal Oxide Semiconductor (CMOS) array or an intensified camera.

8. A security system according to claim 1, wherein the age of each of said one or persons is estimated by analyzing the distance between the eyes or the amount of reflected light received by each eye or both.

9. A security system according to claim 1, wherein one or more light sources and/or one or more light detectors operate in the following ranges:

(i) 200 nm to 1600 nm;

(ii) 700 nm to 940 nm;

(iii) 1050 nm to 1150 nm; or (iv) 1300 nm to 1450 nm range.

10. A security system according to claim 1, wherein one or more light sources are polarized or include a polarizer and wherein one or more light detectors include a polarizer.

11. A security system according to claim 1, wherein said one or more light detectors can operate in a plurality of exposure times synchronized with the pulse of said one or more light detectors.

12. A security system according to claim 1, wherein a driver in a vehicle is surveyed and an alert is issued when said driver's eyes are closed for more than a predetermined amount of time.

13. A security system according to claim 1, wherein a security personnel is surveyed and an alert is issued when said security personnel's eyes are closed for more than a predetermined amount of time.

14. A security system according to claim 1, coupled with any video or stills camera wherein said video or stills camera is activated when said security system detects a person.

15. A security system according to claim 1, integrated into a rifle, helmet, binoculars, car or aircraft.

16. A security system according to claim 1, wherein the general sanitary condition of a water body is estimated based on the number of fish identified.

17. A security method for detecting the presence of one or more persons in a location to be monitored, said method comprising the steps of:

(i) placing one or more light sources and one or more light detectors on a mechanical bracket;

(ii) directing said one or more light sources in the direction of said location;

(iii) detecting reflections of said one or more light sources by one or more light detectors in order to form an image representing eyes of said one or more persons;

(iv) scanning the location by moving said light bracket and directing said one or more light sources and said one or more light detectors at narrow portions of said location at a time, capturing an image of said narrow portion of said location and moving said one or more light sources together with said one or more light detectors to a new position after each image of said narrow portion of the location is captured; and (v) combining said captured images of said narrow portions of said location to form a single image of said location; and (vi) analyzing said single images to identify and count the number of eyes on said single image.

18. A security method according to claim 17, wherein said one or more light sources or said one or more light detectors comprise a spectrally narrow bandwidth or a spectral filter, said spectral filter comprising: a band pass filter, band stop filter, interference filter, short wave filter, long wave filter, Acousto-optic Tunable filter (AOTF) or any mechanical, electrical or electro physical mechanism that can cause a spectral modification of outgoing or incoming light.

19. A security method according to claim 17, wherein at least one of said one or more light sources and said one or more light detectors operate in the following ranges:

(i) 200 nm to 1600 nm;

(ii) 700 nm to 940 nm;

(iii) 1050 nm to 1150 nm; or (iv) 1300 nm to 1450 nm range.

20. An advertising method for sending commercial advertisements to viewers in front of a display, the method comprising the steps of:

(i) placing a light sources and a light detectors on a mechanical bracket;

(ii) directing said light source in the direction of said viewers;

(iii) detecting reflections of said light source by said light detector in order to form an image representing said viewers;

(iv) scanning the viewers by moving said mechanical bracket an directing said one or more light sources and said one or more light detectors at narrow portions of said viewers at a time, capturing an image of said narrow portion of said viewers and moving said one or more light sources together with said one or more light detectors to a new position after each image of said narrow portion of the viewers is captured;

(v) combining said captured images of said narrow portions of said viewers to form a single image of said viewers;

(vi) analyzing the single image to identify and count the number of eyes on said single image;

(vii) sending one or more advertisement messages to be viewed on said display;

(viii) detecting the presence of at least one viewer in front of said display; and (ix) rewarding said at least one viewer after detecting that said at least one viewer has watched said one or more advertisement messages.

* * * * *